UNITED STATES PATENT OFFICE.

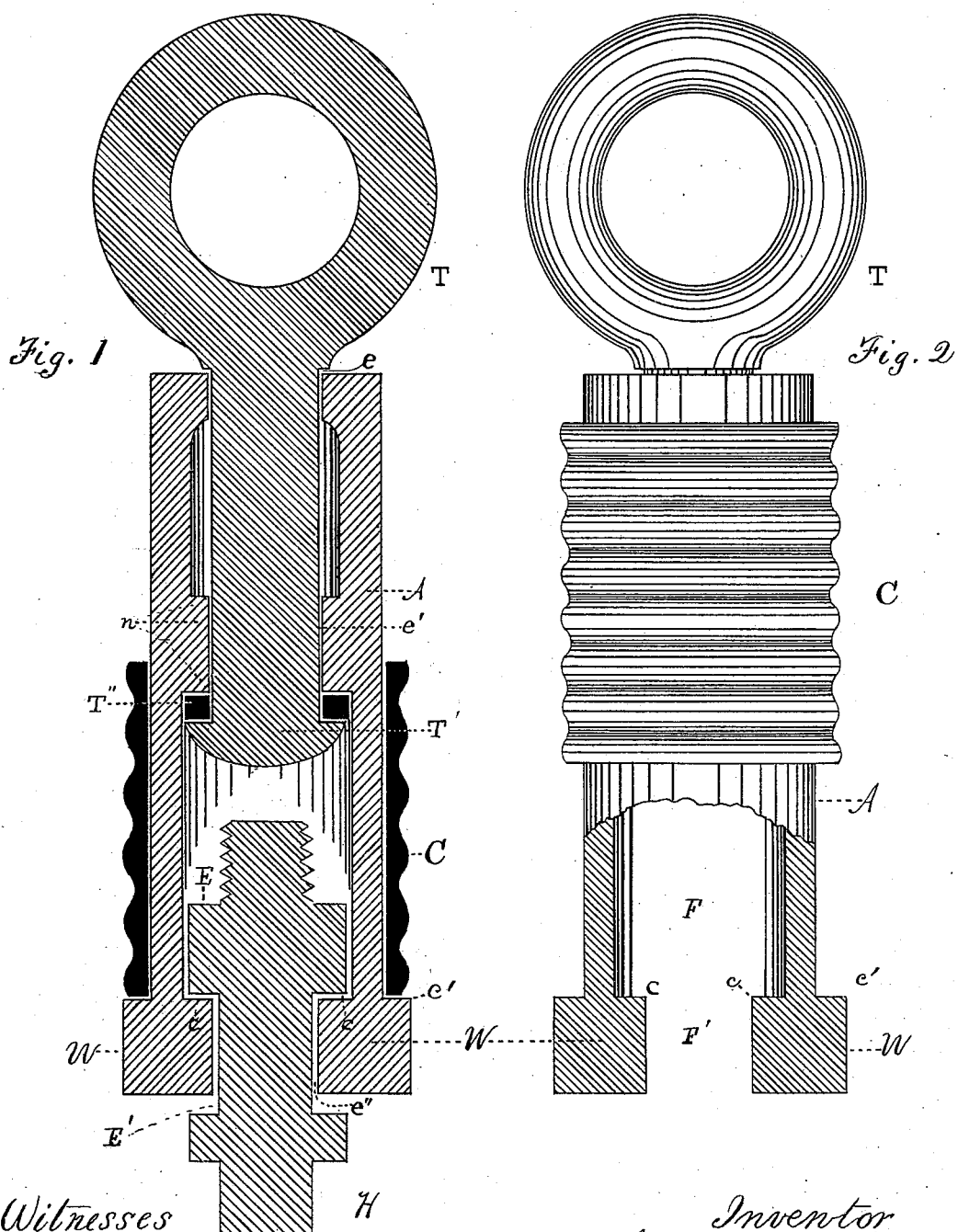

CHARLES H. CUSHING, OF BRADFORD, PENNSYLVANIA.

ELEVATOR FOR SUCKER-RODS.

SPECIFICATION forming part of Letters Patent No. 243,859, dated July 5, 1881.

Application filed May 3, 1881. (No model.)

*To all whom it may concern:*

Be it known that I, CHARLES H. CUSHING, of Bradford, McKean county, Pennsylvania, have invented new and useful Improvements in Elevators for Sucker-Rods; and I do hereby declare that the following is a full, clear, and exact description thereof, reference being had to the accompanying drawings and the letters or figures of reference marked thereon.

Elevators for sucker-rods, as heretofore made, have been provided with a hinged bail, to which is attached a rope for elevating or lowering the sucker-rod held within the jaws of the elevator. If there were no jarring or sudden hitches in elevating or lowering the sucker-rods, this device would answer all the purposes; but such is not the case, as may be witnessed every day in the oil-producing country. If the sucker-rod by any reason should come to a sudden halt, the elevator-rope would become slack, and the bail on the elevator would fall outward and draw the jaws of the latter from the neck of the sucker-rod, which in all probabilities would fall back or down into the well and cause a good deal of trouble and delay in fishing it out. To provide against such accidents it has been common to put a tongue across the free ends of the jaws; but that device often proves defective, for the reason that it is not strong enough to overcome the force of the jerk that the bail would give in falling suddenly.

To obviate these difficulties is the object of my invention; and to that end it consists of means, which will hereinafter be described, and pointed out in the claims, whereby this result is attained.

Figure 1 represents a vertical longitudinal section; and Fig. 2, a rear elevation, having its lower end partly broken away to show the opening through which the collar and neck of the sucker-rod are inserted.

A represents a hollow cylinder; F F', openings in the front of cylinder A; C, a sleeve which fits over cylinder A; T, a swiveled pivot, to which is attached the elevator-rope; and H, the sucker-rod, having collar E and neck E'.

The cylinder A may be made of any suitable material; but I prefer to make it of malleable iron. The cylinder is made hollow from end to end, and is provided with openings $e$ $e'$ $e''$. A swivel-pin, T, is inserted through openings $e$ $e'$, and its lower part, T', is spread or riveted to prevent it from coming out. A washer, T'', is placed between part T' and shoulder $n$. Below the shoulder $n$ the cylinder is enlarged to receive the collar of a sucker-rod connection, which is inserted through openings F. The lower surface of this collar rests upon a shoulder, $c$, on the supporting-jaws W, which form a mouth, F', and opening $e''$, through which the neck E' of the sucker-rod passes when the collar E is placed in the cylinder A.

The sleeve C is made to conform to the shape of and encircles the shoulder A, and when in position is supported upon a shoulder, $c'$, upon the jaws W. This sleeve can be lifted upwardly. If it be released while lifted, it will fall by its own gravity upon the shoulder $c'$ and cover the opening F, through which the collar of the sucker-rod is passed, and prevent the latter from slipping or falling out when the rods have been elevated or lowered. It is obvious that a sudden jar would not slip the sleeve and allow the rod to fall out, as there is no swinging bail to pull the elevator over and tilt the sleeve. The outer surface of the sleeve is corrugated to prevent the hand from slipping when said sleeve is elevated.

I do not confine myself to the use of a cylinder, as it is obvious that the latter may be square or otherwise and perform the same function. The collar C should conform to the shape of the part A.

The operation of removing the rods is as follows: A joint is held above the hole or well by a wrench, and is ready to receive the elevator and lift it to the top of the derrick. The elevator is lowered to a point opposite the collar upon the sucker-rod, and the sleeve lifted to expose the opening F. It is then drawn toward the rod and the collar E slipped into the cylinder through opening F, and the neck is at the same time slipped in between the jaws W. The collar C is then dropped. When the elevator is pulled upwardly the collar E rests upon shoulder $c$. When the elevator has reached the top of the derrick the swivel-man lifts sleeve C, detaches the elevator, and sends it back to the floor, where it is attached to another rod, and so on until all the rods have been removed.

What I claim as new is—

1. An elevator for sucker-rods, having a sleeve or drop-ring, substantially as described, for holding the sucker-rod in the manner set forth.

2. An elevator for sucker-rod, having a sleeve or drop-ring provided with corrugations upon its outer surface, substantially as described.

3. An elevator for sucker-rods, consisting of a cylinder having a slot for the collar and neck of a sucker-rod and a seat for the collar, in combination with a sleeve for holding said sucker-rod collar in place in the manner set forth.

In testimony that I claim the foregoing I have hereunto set my hand this 27th day of April, 1881.

CHAS. H. CUSHING.

Witnesses:
M. F. HALLECK,
D. L. LEWIS.